United States Patent [19]
Saibara et al.

[11] Patent Number: 5,376,465
[45] Date of Patent: Dec. 27, 1994

[54] MAGNETIC RECORDING MEDIUM HAVING A FERROMAGNETIC THIN FILM AND HYDROLYSIS RESISTANT PROTECTIVE LAYER COMPRISING A TERTIARY CARBOXYLIC ACID HAVING AT LEAST TWO FLUORINE ATOMS

[75] Inventors: Shoji Saibara; Kazushi Miyata, both of Osaka, Japan

[73] Assignee: Hitachi Maxell, Ltd., Osaka, Japan

[21] Appl. No.: 82,817

[22] Filed: Jun. 28, 1993

Related U.S. Application Data

[63] Continuation of Ser. No. 791,152, Nov. 13, 1991, abandoned.

[30] Foreign Application Priority Data

Nov. 19, 1990 [JP] Japan .................................. 2-313226

[51] Int. Cl.$^5$ ................................................ G11B 5/00
[52] U.S. Cl. ............................... 428/694 TP; 428/219; 428/336; 428/694 TF; 428/900
[58] Field of Search ......... 428/694, 695, 900, 694 TP, 428/694 TF, 219, 336; 252/64, 565

[56] References Cited

U.S. PATENT DOCUMENTS

| 3,256,321 | 6/1966 | Durr et al. | 252/565 |
| 3,282,971 | 11/1966 | Metro et al. | 252/565 |
| 3,341,574 | 9/1967 | Taylor et al. | 252/565 |
| 3,523,084 | 8/1970 | Chao et al. | 252/565 |
| 4,554,220 | 11/1985 | Yamamoto et al. | 428/694 |
| 4,735,848 | 4/1988 | Kondo et al. | 428/219 |
| 4,849,291 | 7/1989 | Yacobucci et al. | 428/422 |
| 5,082,709 | 1/1992 | Suzuki et al. | 428/64 |

FOREIGN PATENT DOCUMENTS 59-087625  5/1984  Japan .

Primary Examiner—Stevan A. Resan
Attorney, Agent, or Firm—Birch, Stewart, Kolasch & Birch

[57] ABSTRACT

A magnetic recording medium having a non-magnetic substrate, a ferromagnetic metal thin film layer formed on one surface of the substrate and water adsorbed on the magnetic layer, wherein an ester having a lower hydrolysis speed than n-butyl stearate coexists on the ferromagnetic metal thin film layer with the water.

2 Claims, No Drawings

MAGNETIC RECORDING MEDIUM HAVING A FERROMAGNETIC THIN FILM AND HYDROLYSIS RESISTANT PROTECTIVE LAYER COMPRISING A TERTIARY CARBOXYLIC ACID HAVING AT LEAST TWO FLUORINE ATOMS

This application is a continuation of application Ser. No. 07/791,152 filed on Nov. 13, 1991, now abandoned.

BACKGROUND OF THE INVENTION

1. Field of the Invention

The present invention relates to a magnetic recording medium, and more particularly, it relates to a ferromagnetic metal thin film recording medium having excellent reliability.

2. Description of the Related Art

In general, widely used is a magnetic recording medium which is produced by applying a magnetic paint containing a dispersed magnetic powder such as an oxide powder (e.g. $\gamma$-$Fe_2O_3$, $Fe_3O_4$, an intermediate oxide of $\gamma$-$Fe_2O_3$ and $Fe_3O_4$, Co-modified $\gamma$-$Fe_2O_3$ and Co-modified $Fe_3O_4$, $CrO_2$, Ba ferrite, etc.), a metal powder (e.g. Fe, Co, etc.), alloy powder (e.g. Fe-Ni-Cr, etc.) or a nitride powder (e.g. iron nitride, etc.) and an organic binder resin such as a polyurethane resin, a polyester resin or a vinyl chloride resin on the substrate and drying the magnetic paint to form a magnetic layer.

A ferromagnetic metal thin film recording medium is considered a high magnetic recording density medium, because it is easy to achieve a high coercive force of a thin film magnetic layer in comparison with the coating type magnetic medium.

Recently, with a request for a high magnetic recording density in the ferromagnetic metal thin film recording medium field, the thin film ferromagnetic metal thin film recording medium, which comprises a ferromagnetic metal thin film formed on a substrate, such as a polyester film or a polyimide film produced by metal plating or vapor deposition such as vacuum deposition, sputtering and ion plating, has attracted considerable attention and put to practical use.

However, as the ferromagnetic metal film does not include a binder or has too good of a surface smoothness, the durability and running stability of the magnetic medium is not excellent. To solve such a problem, it is proposed to use an ester lubricant as a protective layer on the surface of the ferromagnetic metal thin film (cf. Japanese Patent Kokai Publication Nos. 85427/1985, 236118/1987 and 210615/1990).

Under the present circumstances, however, the use of the ester lubricant with the ferromagnetic metal thin film does not prevent contamination of the magnetic head or drop-out of signal efficiency.

SUMMARY OF THE INVENTION

An object of the present invention is to provide a ferromagnetic metal thin film recording medium that uses an ester on the recording medium, which is difficult to hydrolyze and has excellent reliability as a protective layer.

DETAILED DESCRIPTION OF THE INVENTION

During the development of the present invention, it was determined that the contamination of the magnetic head and the drop-out of signals are caused by adhesion of foreign material to the magnetic head. The foreign material was analyzed as a metal salt of a carboxylic acid which is decomposed from the ester lubricant.

To clarify the mechanism of the decomposition of the ester, the relationship between the various parameters such as temperature, water, and oxygen were studied. As a result of this study, it has been found that the ester is decomposed by water. Thus, one cause of the decomposition is hydrolysis. Therefore, to provide a ferromagnetic metal thin film recording medium that has excellent reliability, an ester lubricant which is hydrolysized with difficulty should be used.

According to the present invention, an ester having a lower hydrolysis rate than n-butyl stearate is present on the ferromagnetic metal thin film formed on the nonmagnetic substrate. In the present invention, therefore, the ester lubricant may be any one of an umber of ester lubricants having a lower hydrolysis rate than n-butyl stearate. The molecular weight, preferably, is at least 200. In particular, the ester is a tertiary carboxylic acid ester having at least two fluorine atoms.

The tertiary carboxylic acid ester can be synthesized from a tertiary carboxylic acid and an alcohol having at least two fluorine atoms.

Examples of tertiary carboxylic acids are 2-isopropyl-2,3-dimethylbutanoic acid, 2-ethyl-2,3,3-trimethylbutanoic acid, 2,2,4,4-tetramethylpentanoic acid, 2,3,1,-tetramethylpentanoic acid, 2,2,3,3-tetramethylpentanoic acid, 2-isopropyl-2,3,5,5-tetramethylhexanoic acid, 2,3, 4-trimethyl-2-neopentylpentanoic acid, 2,2,4,4,6,6-hexamethylheptanoic acid, 2,4,4-trimethyl-2-tert-pentylpentanoic acid, 2-ethyl-2,3,3,5,5-pentamethylhexanoic acid and the like.

Examples of the alcohol are 1,1,9-trihydroperfluorononanol, 1,1-dihydroperfluorobutanol, 1,1-dihydroperfluorooctanol, 1,1,7-trihydroperfluoroheptanol, and the like.

A method for producing the ester may be any one of the known conventional methods, such as an acid chloride process and a condensation process. In particular, when water is to be adsorbed on the ferromagnetic metal thin film, it is necessary to use at least one ester having a lower hydrolysis rate than n-butyl stearate, since the ferromagnetic metal thin film is chemically active, so that the ester lubricant would normally be easily hydrolyzed by water adsorbed on the active surface of the metal.

Examples of the ferromagnetic material for the film are ferromagnetic metals such as iron, cobalt and nickel or ferromagnetic alloys such as Co-Cr, Fe-Co-B, Co-Ni-Fe-B, Fe-Co-Ni, Fe-Ni, Fe-Co, Co-Pt, Co-Ni-Pt and Co-Ni.

In the present invention, the ester lubricant may be used independently or in combination with other lubricants. Examples of lubricants which can be used in combination with the ester lubricant are fatty acids, metal salts of fatty acids, fatty acid esters, fatty acid amides, fatty acid alcohols, phosphoric acid esters, phosphorous acid esters, monosulfide, alkyl phosphite, alkyl phosphate, paraffins, modified silicone oil, and resin fine powders of perfluoropolyether and polytetrafluoroethylene.

The ester lubricant, having a lower hydrolysis rate than n-butyl stearate, can be applied on the ferromagnetic metal thin film layer by coating or spraying a solution of the ester lubricant in a solvent onto the substrate, or by dipping the substrate in the solution, and is then dried.

The amount of the ester lubricant of the present invention is at least one and a half times as much as the water content. The suitable amount of the ester lubricant depends on this condition. In general, it is preferably present in the range of from 0.5 to 50 mg/m$^2$, more preferably in the range of from 1 to 20 mg/m$^2$.

The ferromagnetic thin film is made by vacuum deposition, ion plating or sputtering, using ferromagnetic metals such as iron, cobalt and nickel or ferromagnetic alloys such as Co-Cr, Fe-Co-B, Co-Ni-Fe-B, Fe-Co-Ni, Fe-Ni, Fe-Co, Co-Pt, Co-Ni-Pt and Co-Ni. A thickness of the magnetic layer if preferably in the range of from 0.03 to 1 μm.

The ferromagnetic thin film recording medium may have a backcoating layer comprising a binder resin, such as vinyl chloride resins, polyurethane resins and cellulose resins and carbon black, on the other side of the substrate.

In the case of the ferromagnetic metal thin film, the lubricant is sometimes supplied on the ferromagnetic thin film by winding contact between a surface of the thin magnetic film and a porous backcoating layer containing the lubricant in the pores because of no space to keep the lubricant in the magnetic layer. The magnetic paint type magnetic recording medium, on the other hand, keeps the lubricant in pores in the magnetic layer. When the lubricant is kept in the porous backcoating layer, there is a good chance that water in the air will get into the pores, so that water will be applied to the ferromagnetic metal thin film by the winding contact together with the lubricant. Therefore, the backcoating layer sometimes accelerates the hydrolysis of the ester. However, this problem can be overcome by using the ester lubricant of the present invention.

Examples of the non-magnetic substrate are plastics such as a polyethylene terephtalate, polyethylene naphthalate, polycarbonate, polyimide and polyvinylchloride, aluminum alloys and titanium alloys. The shape of the non-magnetic substrate may be any kind, for example a tape, a sheet, a disk, a card or the like. It may comprise some projection on the surface.

PREFERRED EXAMPLES OF THE INVENTION

The present invention will be illustrated by the following Examples. The present invention is not limited by these Examples.

I. Estimation of the Hydrolysis

Cobalt was deposited on one surface of a polyethylene terephthalate film having a thickness of 15 μm by the oblique deposition method, to form a ferromagnetic metal thin film layer having a thickness of 1200 Å.

On the ferromagnetic metal thin film, a solution of a compound shown in Table 1 in isopropanol in an amount of 50 mg/cm$^2$ was applied. Then the film was kept standing at a temperature of 60° C. and relative humidity of 80% for 24 hours to keep water on the surface of the magnetic layer. Thereafter, an amount of a product generated by hydrolysis was measured. The results are shown in Table 1 together with the compound, wherein the value is a relative value to the amount in the compound 1.

TABLE 1

| Compounds | | Amount of hydrolysis |
|---|---|---|
| Compound 1 | 1,1-Dihydroperfluorobuthyl 2-ispropyl 2,3-dimethylbutanoate | 1 |
| Compound 2 | 1,1,7-Trihydroperfluoroheptyl 2,2,3,4-tetramethyepentanoate | 1 |
| Compound 3 | 1,1,9-Trihydroperfluorononyl 2-ethyl-w,e,e,5,5-pentamethylhexanoate | 1 |
| Compound 4 | 1,1-Dihydroperfluorooctyl 2,2,4,4,6,6-hexamethylheptanoate | 1 |
| Compound 5 | 1,1,9-Trihydroperfluorononyl 2,2,4,4,6,6-hexamethylheptanoate | 1 |
| Compound 6 | 1,1,9-Trihydroperfluorononyl oleate | 1000 |
| Compound 7 | 1,1-Dihydroperfluorooctyl oleate | 1000 |
| Compound 8 | n-Butyl stearate | 1000 |
| Compound 9 | Methyl stearate | 2000 |
| Compound 10 | 1,1-Dihydroperfluorooctyl 2-ethylhexanoate | 20 |

II. Production of Tape

Example 1

Cobalt was deposited on one surface of a polyethylene terephthalate film having a thickness of 15 μm by the oblique deposition method to form a ferromagnetic metal thin film layer having a thickness of 1200 Å.

Then, the film was coated with a solution of Compound 1 indicated in Table 1 in isopropylanol to an amount of 10 mg/m$^2$, dried and slit to produce a tape with a width of 8 mm.

Examples 2–6

In the same manner as in Example 1 but using each of the Compounds 2 to 5 and a Compound 10 in place of Compound 1, a tape was produced.

Comparative Examples 1–4

In the same manner as in Example 1 but using each of the Compounds 6 to 9 in place of Compound 1, a tape was produced.

Contaminations of the magnetic head and the number of drop-out at the temperature of 20° C. and relative humidity of 50% and the temperature of 40° C. and relative humidity of 80% were examined by using a 8 mm VTR (EV-S900, manufactured by Sony Co.) according to the following procedures:

Contamination of the magnetic head was observed by a microscope after the tape having a 100 m length was run in 8 mm VTR 1000 times.

Drop-out was estimated by counting drop-out signals which continued at least 5 μs during 30 minutes input and output signals. The results are shown in Table 2.

TABLE 2

| | Contamination of the magnetic head | | drop-out | |
|---|---|---|---|---|
| | 20° C. 50% RH | 40° C. 80% RH | 20° C. 50% RH | 40° C. 80% RH |
| Example 1 | ◯ | ◯ | 2 | 6 |
| Example 2 | ◯ | ◯ | 3 | 8 |
| Example 3 | ◯ | ◯ | 3 | 7 |
| Example 4 | ◯ | ◯ | 4 | 8 |
| Example 5 | ◯ | ◯ | 5 | 9 |
| Example 6 | ◯ | Δ | 11 | 50 |

TABLE 2-continued

| | Contamination of the magnetic head | | drop-out | |
| --- | --- | --- | --- | --- |
| | 20° C. 50% RH | 40° C. 80% RH | 20° C. 50% RH | 40° C. 80% RH |
| Comparative Example 1 | ○ | X | 20 | 80 |
| Comparative Example 2 | ○ | X | 30 | 100 |
| Comparative Example 3 | Δ | X | 40 | 110 |
| Comparative Example 4 | X | X | 100 | 200 |

○—No contamination.
Δ—Slight contamination.
X—Much contamination.

From the results of Table 2, it is understood that the excellent reliability with no contamination and few drop-outs is achieved by a magnetic recording medium comprising a non-magnetic substrate, a ferromagnetic metal thin film layer formed on one surface of the substrate with water adsorbed on the magnetic layer, and an ester having a lower hydrolysis rate than n-butyl stearate coexisting on the ferromagnetic metal thin film layer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording medium comprising a non-magnetic substrate, a ferromagnetic metal thin film layer formed on a front surface of said substrate, and an ester coexisting with water on said ferromagnetic metal thin film layer as a protective layer, said ester comprising a tertiary carboxylic acid ester having at least two fluorine atoms and having a hydrolysis amount of not larger than 20/1000 of that of n-butyl stearate when it is measured by coating a solution of the ester in isopropanol in an amount of 50 mg/m$^2$ on a cobalt film layer having a thickness of 1200 Å which is formed on a polyethylene terephthalate film having a thickness of 15 μm by an oblique deposition method, drying the coated solution and keeping the cobalt film layer at 60° C., 80% RH for 24 hours.

2. The magnetic recording medium according to claim 1, further including a porous backcoating layer formed on a back surface of said substrate.

* * * * *